US007883330B2

(12) United States Patent
Inoue et al.

(10) Patent No.: US 7,883,330 B2
(45) Date of Patent: Feb. 8, 2011

(54) POWDER COMPRESSION MOLDING MACHINE AND APPARATUS FOR CONTINUOUS PRODUCTION OF POWDER COMPRESSION MOLDED ITEM USING THE MACHINE

(75) Inventors: Masakiyo Inoue, Yamatokoriyama (JP); Mitsuho Shibata, Odawara (JP); Ikuru Toyoda, Odawara (JP); Shoushi Tsukamoto, Odawara (JP)

(73) Assignees: Qualicaps Co., Ltd., Yamatokoriyama-shi, Nara (JP); Meiji Dairies Corporation, Tokyo (JP)

( * ) Notice: Subject to any disclaimer, the term of this patent is extended or adjusted under 35 U.S.C. 154(b) by 282 days.

(21) Appl. No.: 12/301,379

(22) PCT Filed: May 15, 2007

(86) PCT No.: PCT/JP2007/059921

§ 371 (c)(1), (2), (4) Date: Nov. 18, 2008

(87) PCT Pub. No.: WO2007/135889

PCT Pub. Date: Nov. 29, 2007

(65) Prior Publication Data

US 2009/0130243 A1 May 21, 2009

(30) Foreign Application Priority Data

May 19, 2006 (JP) ............................ 2006-140010

(51) Int. Cl.
*B29C 43/04* (2006.01)

(52) U.S. Cl. ....................... 425/183; 425/344; 425/351; 425/353

(58) Field of Classification Search .................. 425/78, 425/183–185, 344–345, 350–355
See application file for complete search history.

(56) References Cited

U.S. PATENT DOCUMENTS 3,408,689 A * 11/1968 Heiner ....................... 425/556

(Continued)

FOREIGN PATENT DOCUMENTS

EP 0 590 963 A1 9/1993

(Continued)

OTHER PUBLICATIONS

Miyajima, "Development of Drug Medicine", 1989, vol. 15, p. 240, Hirokawa Publishing Co.

*Primary Examiner*—Richard Crispino
*Assistant Examiner*—Thu Khanh T Nguyen
(74) *Attorney, Agent, or Firm*—Birch Stewart Kolasch & Birch, LLP

(57) ABSTRACT

A powder compression molding machine is configured such that a plurality of lower and upper punches 61, 41 are allowed to enter a plurality of through-die holes 31 provided in first and second molding die sections 32, 33 of a slide plate 3 in a compression molding zone 21 to compressively mold powder and the slide plate 3 is slid to push out compacts downward and collect them in compact discharge zones 22*a*, 22*b*. Even when powder is compressively molded at a low compression force into solids having high porosity, compacts can satisfactorily be molded and collected without crumblingness, the compacts having sufficient high porosity and being dissolvable in water or the like.

8 Claims, 15 Drawing Sheets

U.S. PATENT DOCUMENTS

| | | | | |
|---|---|---|---|---|
| 4,379,685 | A * | 4/1983 | Tada et al. | 425/183 |
| 4,588,370 | A * | 5/1986 | Ichizawa et al. | 425/526 |
| 5,672,364 | A | 9/1997 | Kato et al. | |
| 6,036,974 | A | 3/2000 | Tsushima et al. | |
| 6,316,026 | B1 | 11/2001 | Tatara et al. | |
| 6,749,783 | B2 * | 6/2004 | Everett | 425/352 |
| 7,726,166 | B2 * | 6/2010 | Kong | 72/405.13 |

FOREIGN PATENT DOCUMENTS

| | | | |
|---|---|---|---|
| EP | 0 998 921 | A1 | 1/1999 |
| JP | 62-55109 | A | 3/1987 |
| JP | 2-251400 | A | 10/1990 |
| JP | 6-218028 | A | 8/1994 |
| JP | 8-19589 | A | 1/1996 |
| JP | 2000-95674 | A | 4/2000 |
| WO | WO-2006/004190 | A1 | 1/2006 |

* cited by examiner

POWDER COMPRESSION MOLDING MACHINE AND APPARATUS FOR CONTINUOUS PRODUCTION OF POWDER COMPRESSION MOLDED ITEM USING THE MACHINE

TECHNICAL FIELD

The present invention relates generally to a powder compression molding machine which compressively molds powder into solids each having a desired dimension and shape and a powder compact continuous fabrication system using the machine. More specifically, the invention relates to a powder compression molding machine that can satisfactorily molds and collect compacts without crumblingness even when e.g. milk powder or the like is compressively molded into solids with large voids at a low compression force and that can mold compacts having sufficient voids and dissolving easily in water or the like while retaining their shapes without damage, and a powder compact continuous fabrication system using the machine.

BACKGROUND ART

Solid milk is proposed which is compressively molded from a predetermined amount of powder milk so as to enable preparation of desired milk that is easily portable and eliminates measurement at the time of going out (Patent Document 1: WO2006/004190). A rotary tableting machine used for fabricating tablet medicines and the like are disclosed as a molding machine for compressively molding the solid milk (Patent Document 2: Japanese Patent Laid-open No. Hei 6-218028, Patent Document 3: Japanese Patent Laid-open No. 2000-95674, etc.)

Such tableting machines are used for compressively molding tablet medicines, tablet-like foods, bath agents, agrichemical, and other medical agents and suitably configured to firmly compress and mold powder into relatively hard compacts. Thus, they are not suitable for compressively molding the solid milk mentioned above.

More specifically, solid milk molded from powder milk is required to be compressively molded at a low compression force so as to have a porosity of 30% or more so that it is satisfactorily and quickly dissolved by being poured in warm water. In addition, the solid milk needs practical shape-retaining performance without damage while being transported or taken along.

In the present specification, "porosity" means the ratio of void volume to the bulk volume of powder (see, Edited by Koichiro Miyajima, "Development of Drug Medicine", Vol. 15, Hirokawa Publishing Company, page 240, 1989).

If the tableting machines mentioned above perform compression molding at a lower compression force, the molding speed must be reduced because compacts may be damaged at the time of being discharged and collected from the molding machine after compressively molded. This significantly reduces fabrication efficiency. In addition, since the tableting machines do not essentially aim to perform compression molding at such a low compression force, it is extremely difficult to adjust porosity. That is to say, it is difficult to stably mold solid milk having a porosity of as large as 30% or more. These tableting machines fabricate compacts as below. A lower punch is inserted from below into a hole-like die perforated upward and downward and molding powder is poured in the die and is tamped down with upper and lower punches. Usually the compacts are lifted up with the lower punch and discharged from the upper side of the die. Then the compacts are collected in such a manner as to be raked down from a plate formed with the die. Thus, compacts that are molded at a low compression force so as to increase porosity are likely to disadvantageously crumble at the time of the collection.

[Patent Document 1]
WO 2006/004190
[Patent Document 2]
Japanese Patent Laid-open No. Hei 6-218028
[Patent Document 3]
Japanese Patent Laid-open No. 2000-95674

DISCLOSURE OF THE INVENTION

Problem to Be Solved by the Invention in view of the foregoing, the present invention has been made and it is an object of the present invention to provide a powder compression molding machine that can compressively molds powder such as powder milk into a state having high porosity at a low compression force, that can achieve satisfactory fabrication efficiency without disadvantage such as crumblingness of compacts at the time of collection, and that can efficiently fabricate compacts such as solid milk having high porosity and satisfactory shape-retaining performance, and a powder compact continuous fabrication system using this machine.

Means for Solving the Problems

To achieve the above object, the present invention provides a powder compression molding machine including: a machine main body having a compression molding zone and two compact discharge zones formed on both sides of the compression molding zone; a slide plate provided in the machine main body so as to be slidable in a horizontal direction; a first molding die section provided in the slide plate to include a plurality of arrayed through-die holes; a second molding die section including a plurality of through-die holes arrayed in the same manner as the first molding die section and juxtaposed to the first molding die section in the slide direction on the slide plate; an upper punch body having a plurality of upper punches arrayed to correspond to the through-die holes and disposed above the slide plate so as to be movable upward and downward in the compression molding zone; two compact discharger each having a plurality of discharge pins disposed to correspond to the through-die holes and disposed above the slide plate so as to be movable upward and downward in the two compact discharge zones; a lower punch body having a plurality of lower punches arrayed to face the upper punches and disposed below the slide plate so as to be movable upward and downward; a powder supply mechanism section for pouring molding powder in the through-die holes of the slide plate in the compression molding zone; and compact collection mechanism sections disposed below the slide plate in the respective two compact discharge zones. The slide plate is slid to one of slide limits in which the first molding die section is located at the compression molding zone and the second molding die section is located at one of the compact discharge zones and to the other of the slide limits in which the second molding die section is located at the compression molding zone and the first molding die section is located at the other of the compact discharge zones. In the compression molding zone the lower punches of the lower punch body enter the through-hole die holes of the first or second molding die section to form the bottom walls of the through-die holes, molding powder is poured into the through-die holes by the powder supply mechanism section, and the upper punches of the upper punch body enter the through-die holes, the molding powder is compressively molded by and between the upper punches and the lower punches. In the one compact discharge zone the discharge pins of the compact discharger enter the through-die holes of the second molding die section to press out downwardly the compacts from the through-die holes, the compacts being collected by the compact collection mechanism section. In the other compact discharge zone the discharge pins of the compact discharger enter the through-die holes of the first molding die section to press out downwardly the compacts from the through-die holes, the compacts been collected by the compact collection mechanism section.

That is to say, the powder compression molding by the powder compression molding machine of the present invention is performed in the following manner: At first, in the state where the slide plate is located at the one slide limit, the first molding die section of the slide plate is located at the compression molding zone, the lower punches of the lower punch body enter from below the through-die holes of the first molding die section to form the bottom walls in the through-die. In this sate, the powder supply mechanism section pours molding powder into the through-die holes. The upper punches of the upper punch body enters the through-die holes. The molding powder is compressively molded by and between the upper punches and lower punches. At this time, the second molding die section of the slide plate is located at the one compact discharge zone in which compacts are discharged in the same operation as the compact discharge operation of the first molding die section.

Next, the upper punches of the upper punch body and the lower punches of the lower punch body are withdrawn from the through-die holes. In the state where the compacts are retained in the through-die holes, the slide plate is slid to the other slide limit and the first molding die section in which the compacts are retained in the through-die holes is moved to the other compact discharge zone. The discharge pins of the compact discharger enter from above the through-die holes of the first molding die section to press out downwardly the compacts from the through-die holes. Such compacts are received by the compact collection mechanism section. At this time, the second molding die section located at the one compact discharge zone is moved to the compression molding zone, where the powder compression molding is performed by the same operation described above.

Next, the slide plate is again moved to the one slide limit and in the compression molding zone the powder compression molding is performed in the first molding die section. In addition, the second molding die section is moved to the one compact discharge zone and similarly to the above the compacts are discharged by the discharge pins of the compact discharger and collected by the compact collection mechanism section.

Such operation is repeated. The molding operation is alternately repeated in the first and second molding die sections in the compression molding zone. At the same time, the compact discharge operation from the second molding die section in the one compact discharge zone and the compact discharge operation from the first molding die section in the other discharge zone are alternately repeated. Thus, a plurality of the powder compacts is fabricated continuously.

As described above, the powder compression molding machine of the present invention is configured such that the plurality of lower punches of the lower punch body and the plurality of upper punches of the upper punch body are allowed to enter the plurality of through-die holes provided in the first and second molding die sections of the slide plate, thus causing the upper and lower punches to compressively mold molding powder in the through-die holes. Therefore, even when the upper and lower punches are used to compressively mold powder at a low compression force for providing compacts having high porosity, a plurality of compacts can be molded at a time. In addition, since the two molding sections, the first and second molding die sections, are provided so that the compression molding operation is performed in one of the molding die section while compact discharge operation is performed in the other of the molding die section. Thus, the powder compression molding machine of the invention can efficiently mold compacts having high porosity without a reduction in throughput.

In addition, as described above, the powder compression molding machine of the present invention configured such that the compacts retained in the through-die holes are pressed out downwardly by the discharge pins and discharged to the downside of the slide plate formed with the through-die holes. On the downside of the slide plate the compacts are received by the compact collecting means including the trays or the like. Thus, the compacts can be satisfactorily discharged and collected without application of a large load. Even compacts that are compressively molded by a low compression force and have high porosity can be discharged and collected without being damaged.

Further, unlike the system for allowing a punch to compressively molding powder speedily and continuously, such as the conventional rotary tableting machine, the powder compression molding machine of the present invention is configured to mold a plurality of compacts at a time. Therefore, if exhibiting the same throughput as the conventional rotary tableting machine, the molding machine of the invention can perform compression molding at a relatively slow speed and at a low compression force, which can provide compacts having relatively high porosity. Further, the molding machine of the invention can be set such that compression molding may be performed by operating both the upper and lower punches without reducing the throughput.

In addition, the present invention provides a powder compact continuous fabrication system including: two of the powder compression molding machines juxtaposed to each other; a first conveyor that passes through one of compact discharge zones included in each molding machine; and a second conveyor that passes through the other of the compact discharge zones included each molding machine. One of the molding machines alternately puts compacts on collection trays transferred by both the conveyors and discharges the compacts and the other of the molding machines alternately puts compacts on collection trays which are transferred by both the conveyors and on which compacts have not yet been put, and discharges the compacts.

This continuous fabrication system molds powder compacts by using the two powder compression molding machines of the invention described above and efficiently supplies them to the two conveyor lines including of the first and second conveyors. That is to say, the powder compression molding machine of the invention is configured to include the compact discharge zones at two respective portions as described above so that compacts are alternately discharged from the two compact discharge zones. Then, two of the powder compression molding machines are juxtaposed to each other. The first conveyor for transferring the collection tray is disposed to pass through one of the compact discharge zones of each molding machine. Similarly, the second conveyor is disposed to pass through the other of the compact discharge zones of each molding machine. Each of the powder compression molding machines alternately discharges and supplies compacts to the respective collection trays on the first and second conveyors. Thus, the compacts are efficiently discharged and supplied to both the first and second conveyors in a non-intermittent or continuous manner for fabrication.

Accordingly, the powder compact continuous fabrication system can significantly efficiently and continuously fabricates compacts that are compressively molded at a low compression force and have high porosity.

BENEFITS OF THE INVENTION

The powder compression molding machine of the present invention can satisfactorily mold and collect compacts even when e.g. powder milk or the like is compressively molded into relatively large solids having high porosity at a low compression force, and additionally provide compacts that have sufficient high porosity and are dissolvable in water or the like. Further the powder compact continuous fabrication system composed of the molding machines can significantly efficiently and continuously fabricate the compacts described above.

BEST MODE FOR CARRYING OUT THE INVENTION

The present invention is more specifically described below illustrating an embodiment.

Figure 1:
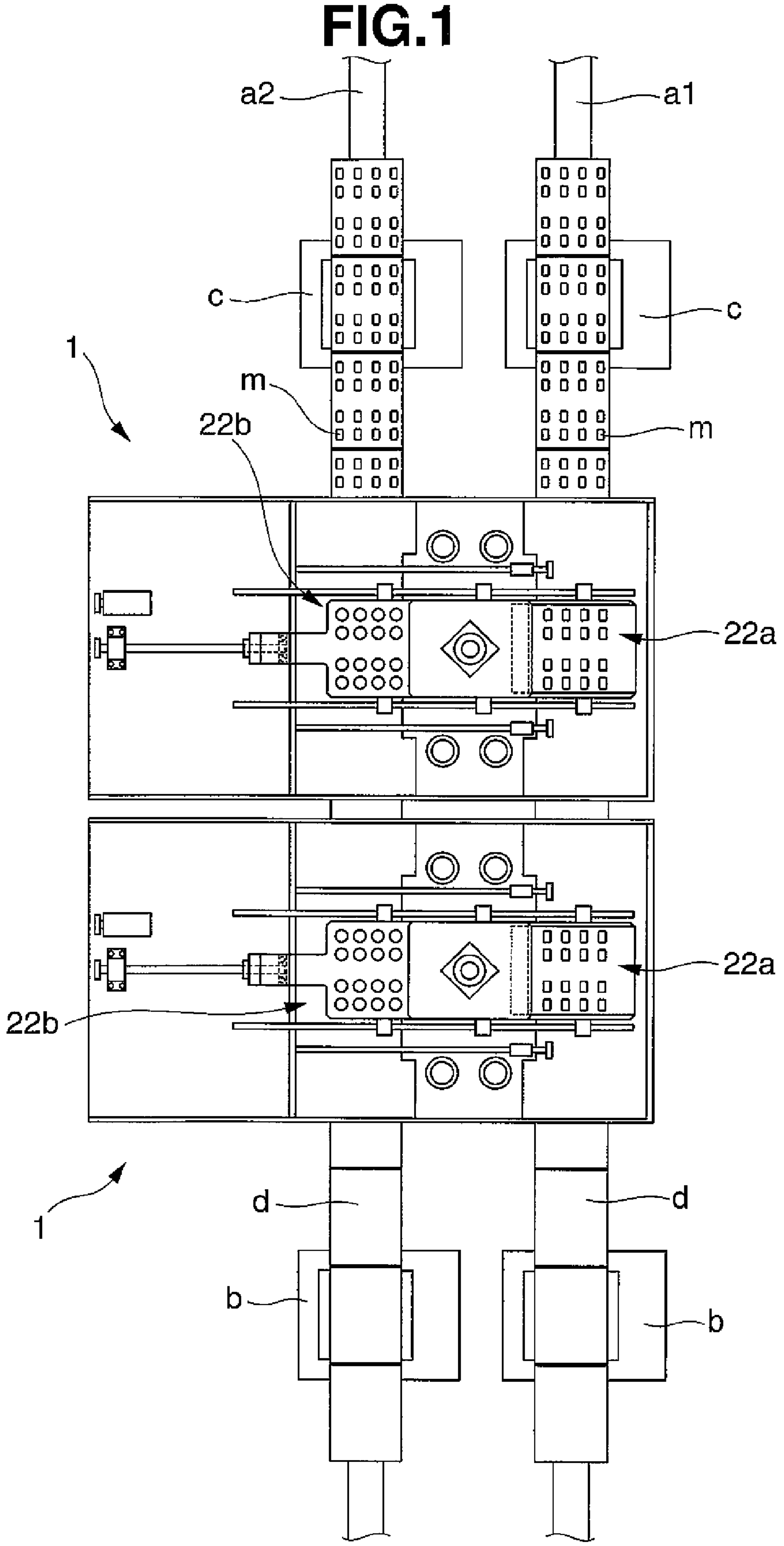
FIG. 1 is a schematic view of a powder compact continuous fabrication system composed of powder compression molding machines according to the present invention by way of example.

FIG. 1 illustrates a powder compact continuous fabrication system composed of powder compression molding machines 1, 1 according to the present invention. This system allows two conveyor lines including of a first conveyor a1 and a second conveyor a2 to transfer respective collection trays d for collecting compacts and allows powder compacts compressively molded by the powder compression molding machines 1, 1 to be discharge and collected on the respective collection trays d for transport.

Figure 2:
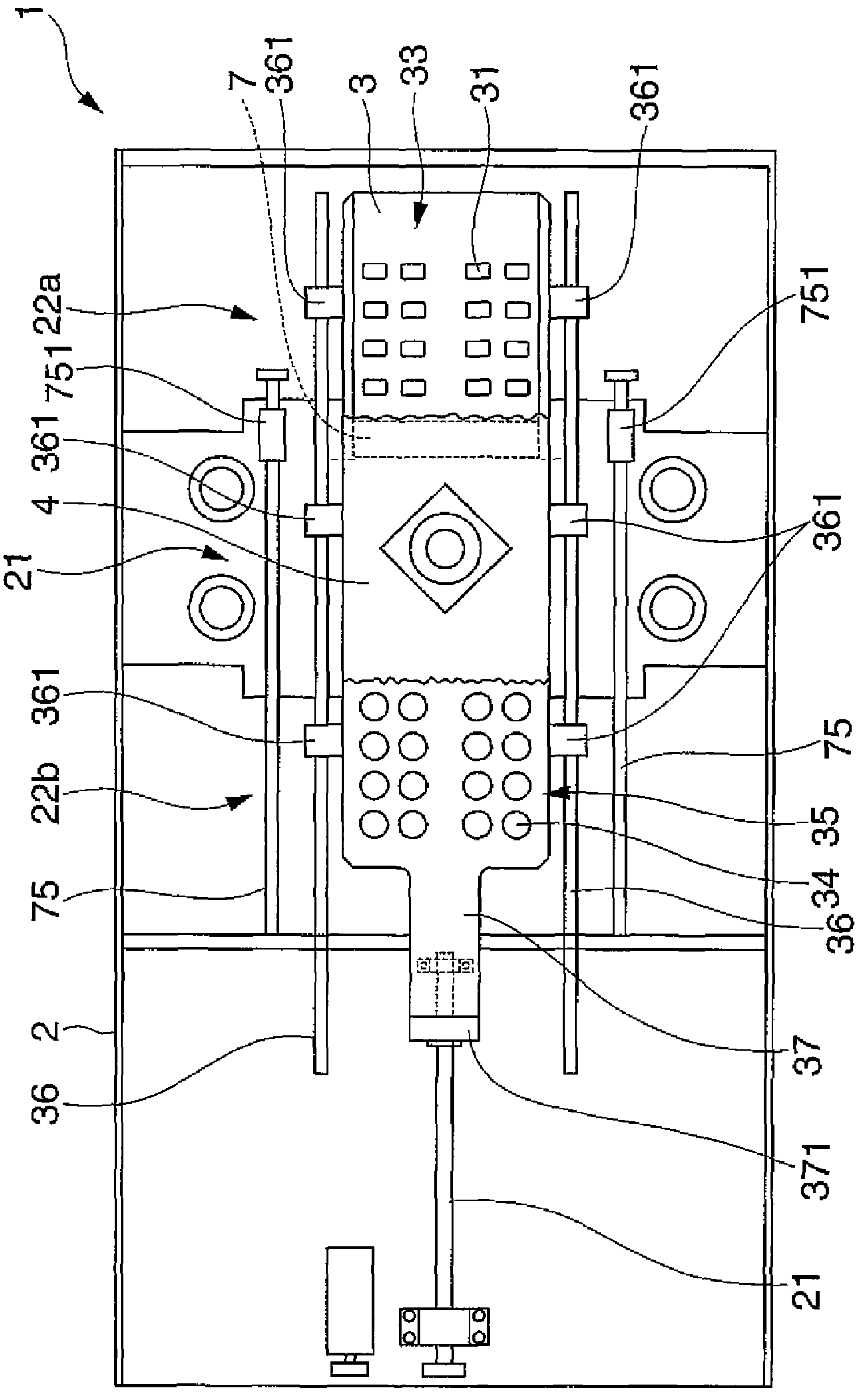
FIG. 2 is a schematic plan view of a powder compression molding machine according to an embodiment which constitutes part of the fabrication system.
Figure 3:
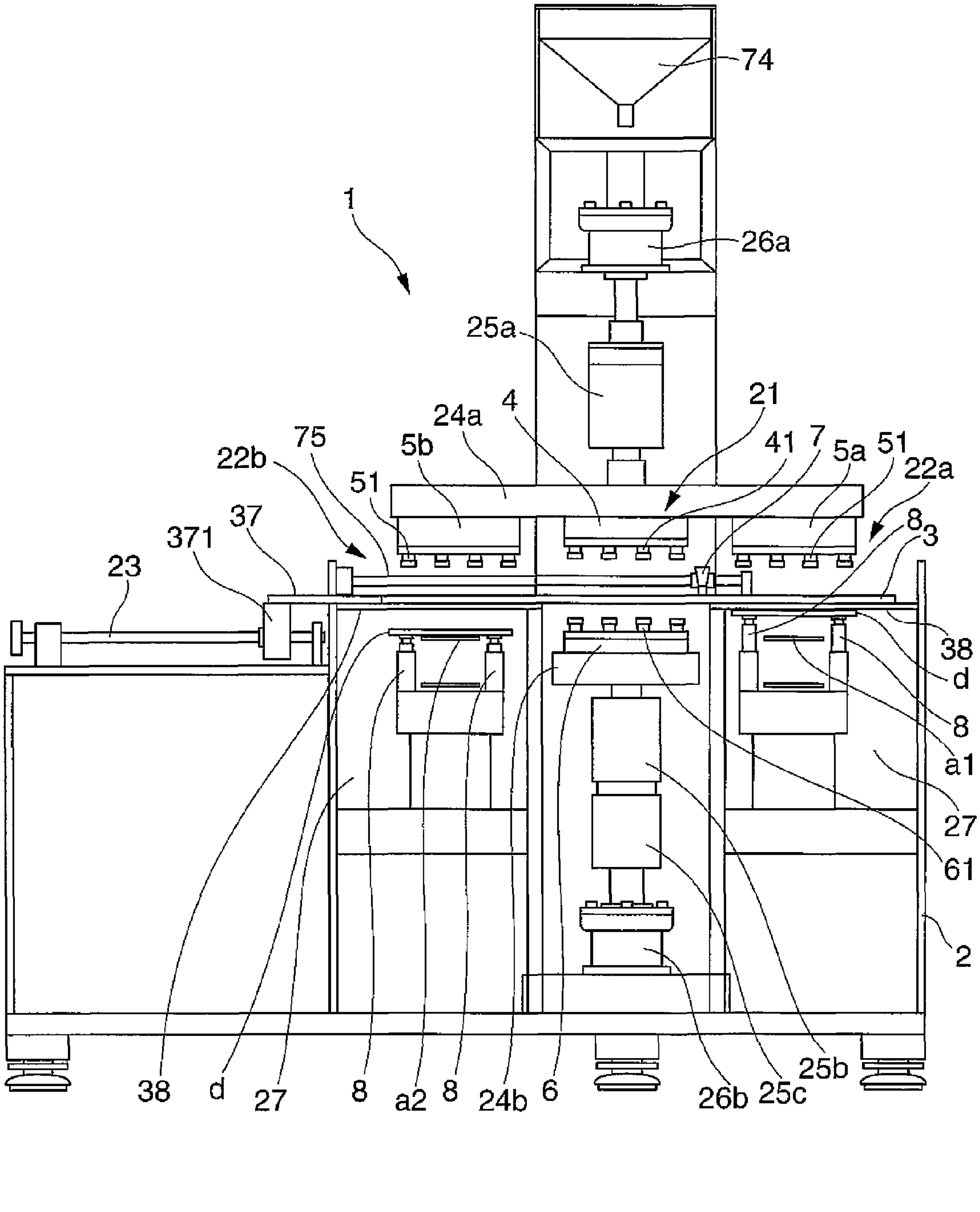
FIG. 3 is a schematic lateral view of the powder compression molding machine.
Figure 4:
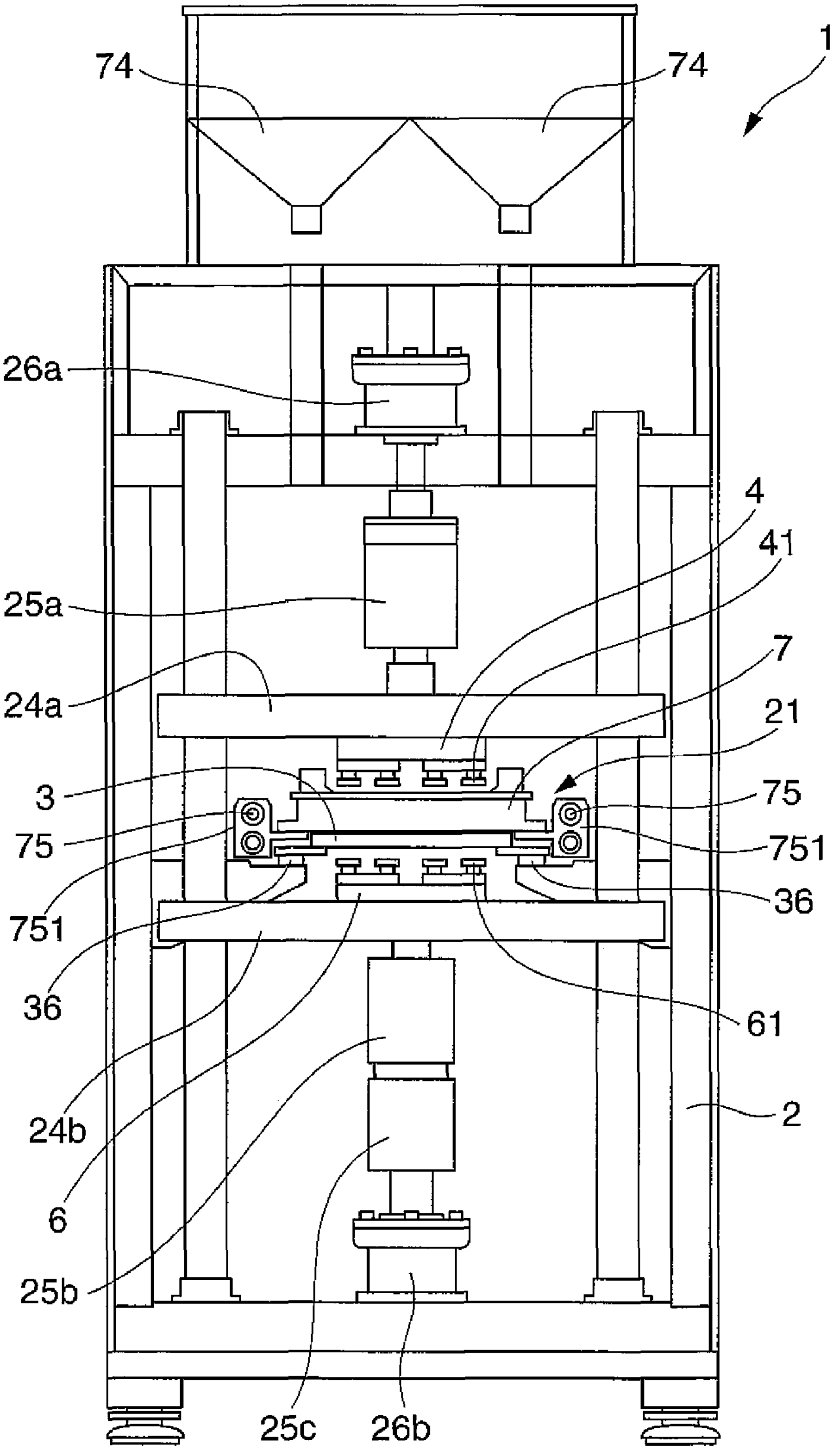
FIG. 4 is a schematic front view of the powder compression molding machine.

Referring to FIGS. 2 to 4, the powder compression molding machine 1 includes a machine main body 2, a slide plate 3, an upper punch body 4, compact dischargers 5*a*, 5*b*, and a lower punch 6. The machine main body 2 has a compression molding zone 21 where powder is compressively molded and two compact discharge zones 22*a*, 22*b*. The slide plate 3 is disposed on the machine main body 2 so as to be slidable horizontally. The upper punch body 4 is disposed above the slide plate 3 in the compression molding zone 21 so as to be movable upward and downward. The compact dischargers 5*a* and 5*b* are disposed above the slide plate 3 in the respective compact discharge zones 22*a* and 22*b* so as to be movable upward and downward. The lower punch 6 is disposed below the slide plate 3 in the compression molding zone 21 so as to be movable upward and downward.

Figure 5:
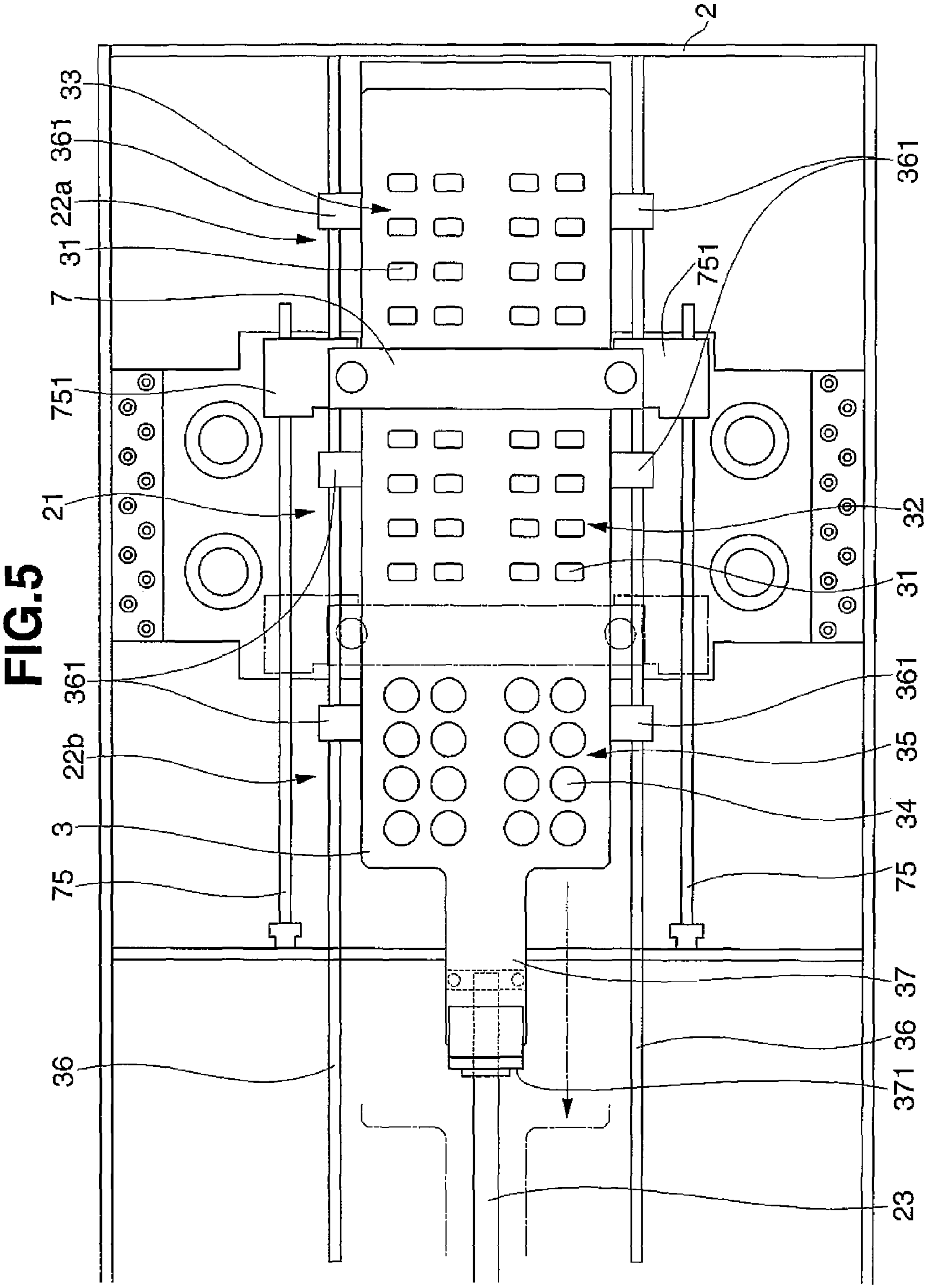
FIG. 5 is an enlarged schematic plan view illustrating a state in which a slide plate of the molding machine is located in one of slide limits.
Figure 6:
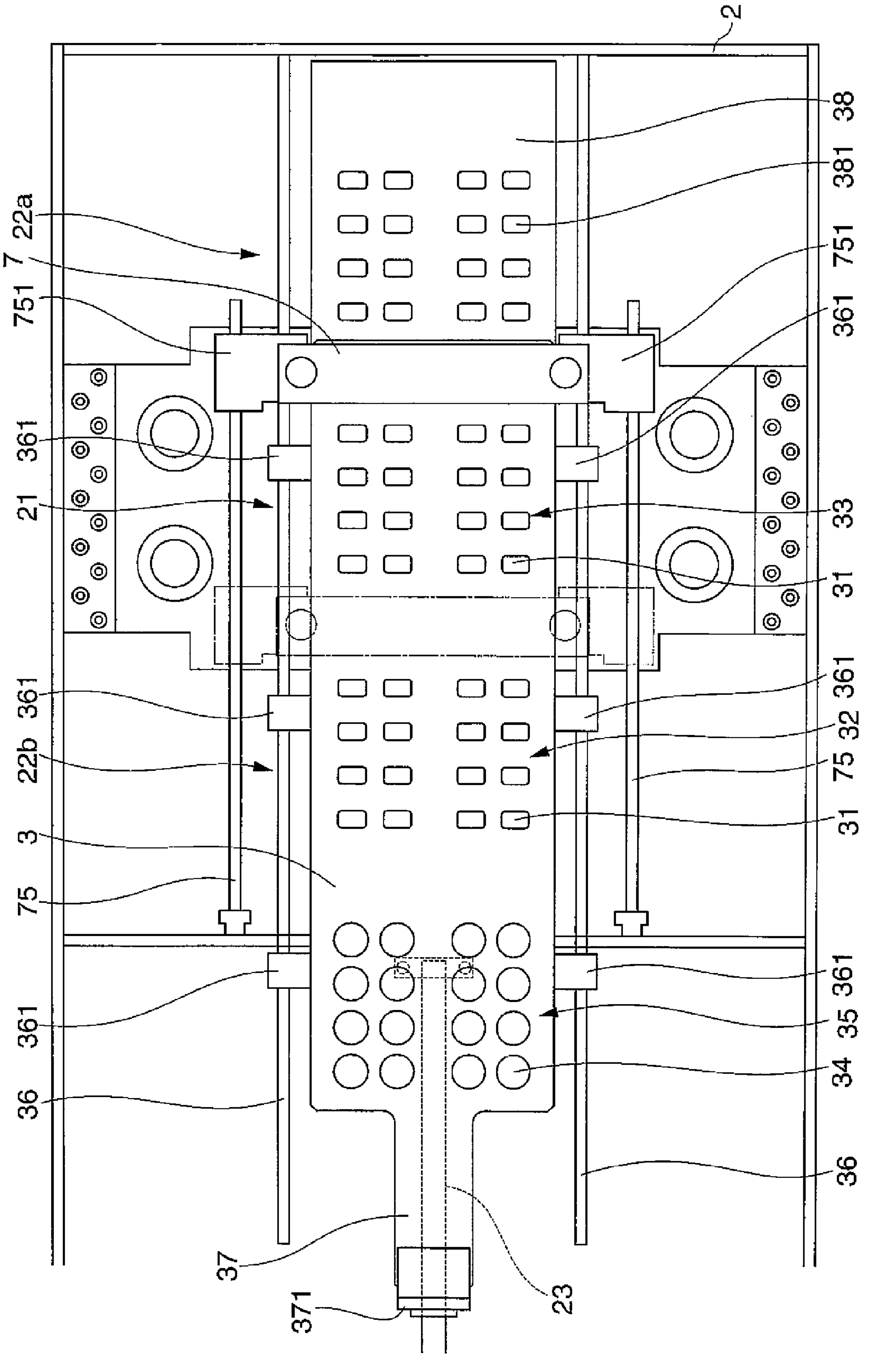
FIG. 6 is an enlarged schematic plan view illustrating a state in which the slide plate is located in the other slide limit.

As shown in FIGS. 5 and 6, the slide plate 3 is supported by slide rails 36, 36 installed on the machine main body 2 so as to be slidable horizontally via a plurality of sliders 361.

A first molding die section 32 and a second molding die section 33 are provided in the slide-wise middle portion of the slide plate 3. The first molding die section 32 is formed with a large number of (16 in the embodiment) through-die holes 31 which perforate upward and downward and are arranged in an arrayed manner. Similarly, the second molding die section 33 is formed with a large number of (16 in the embodiment) through-die holes 31 which are arranged at one end in the slide direction in an arrayed manner. Further, a punch insertion section 35 is formed in the other end in the slide direction. In the punch insertion section 35, a plurality of (16 in the embodiment) circular through-holes 34 each slightly larger than the through-die holes 31 are arrayed in the same manner as the first and second molding die sections 32, 33.

The slide plate 3 is formed with a tongue-like projection 37 at the central portion of the other end thereof. An internal thread body 371 secured to the tip of the projection 37 is threadedly engaged with a drive screw 23 provided on the machine main body 2. The drive screw 23 is rotated normally and reversely by a drive source not shown to cause the slide plate 3 to move horizontally in a reciprocative slide manner.

As shown in FIG. 6, the machine main body 2 is provided with a discharge guide plate 38 which is disposed closely below the slide plate 3 in the one compact discharge zone 22*a*. The discharge guide plate 38 is formed with a large number of (16 in the embodiment) compact passing holes 381 each of which are slightly larger than the through-die holes 31 and which are arrayed in the same manner as the first and second molding die sections 32, 33. Similarly, a discharge guide plate 38 is disposed also in the other compact discharge zone 22*b*.

As shown in FIGS. 3 and 4, the upper punch body 4 is disposed above the slide plate 3 in the compression molding zone 21 so as to be movable upward and downward. The upper punch body 4 is formed with a large number of (16 in the embodiment) upper punches 41 extending downward therefrom on the lower surface of a thick plate-like main body. The upper punches 41 are each formed with a square block-like compression part 411 (see FIGS. 7 to 10) at the tip thereof. In addition, the upper punches 41 are arrayed in the same manner as the through-die holes 31 constituting the first and second molding die sections 32, 33 of the slide plate 3 so as to extend downward. Incidentally, although not illustrated, the thick plate-like main body is provided with a spring which releases pressure applied to the upper punches when the pressure exceeds a predetermined level.

As shown in FIG. 3, the compact dischargers 5*a* and 5*b* are disposed above the slide plate 3 in the compact discharge zones 22*a* and 22*b*, respectively, so as to be movable upward and downward. The compact dischargers 5*a*, 5*b* are provided with a large number of (16 in the embodiment) discharge pins 51 extending downward on the lower surface of a thick plate-like main body. The discharge pins 51 are each formed with a square block-like depressing part 511 (see FIGS. 11 to 14). The discharge pins 51 extend downward and are arrayed in the same manner as the through-die holes 31 constituting the first and second molding die sections 32, 33 of the slide plate 3.

As shown in FIGS. 3 and 4, the compact dischargers 5*a*, 5*b* and the upper punch body 4 are attached to the same moving body 24*a* so as to integrally move upward and downward. In this case, as shown in FIG. 3, the compact dischargers 5*a*, 5*b* are disposed so as to more project downward than the upper punch body 4 and designed to move more downward than the upper punch body 4.

In addition, the moving body 24*a* attached with the compact dischargers 5*a*, 5*b* and with the upper punch body 4 is suspended by a hydraulic cylinder 25*a* as shown in FIG. 3 and is driven thereby to move upward and downward. Further, the hydraulic cylinder 25*a* is suspended by a jack 26*a*, which can vertically adjust the position of the moving body 24*a* moved upward and downward by the hydraulic cylinder 25*a*. Thus, the amount of ingress of the upper punch 41 into the through-die holes 31 can be adjusted.

As shown in FIGS. 3 and 4, the lower punch body 6 is disposed below the slide plate 3 in the compression molding zone 21 so as to be movable upward and downward. The lower punch body 6 is provided with a large number of lower punches 61 which are formed on the upper surface of a thick plate-like body so as to extend upright. The lower punches 61 are each formed with a square block-like compression part 611 at the tip thereof (see FIGS. 7 to 10). The lower punches 61 extend upright and are arrayed in the same manner as the through-die holes 31 constituting the first and second molding die sections 32, 33 of the slide plate 3.

The lower punch body 6 is attached to a moving body 24*b* as shown in FIGS. 3 and 4. The moving body 24*b* is supported by a first hydraulic cylinder 25*b*, which is further supported by a second hydraulic cylinder 25*c*. The second hydraulic cylinder 25*c* moves the lower punch body 6 together with the first hydraulic cylinder 25*b* upward and downward, thereby allowing the lower punches 61 to form bottom walls in the respective associated through-die holes 31. The first hydraulic cylinder 25*b* allows the lower punches 61 to move in the respective associated through-die holes 31 for compression molding. Note that this operation is detailed later. The second hydraulic cylinder 25*c* is supported by a jack 26*b*, which can further vertically adjust the position of the lower punches 61 moved upward and downward by the first and second hydraulic cylinders 25*b*, 25*c*. Thus, the amount of molding powder poured into the through-die holes 31 can be adjusted.

Figure 15:
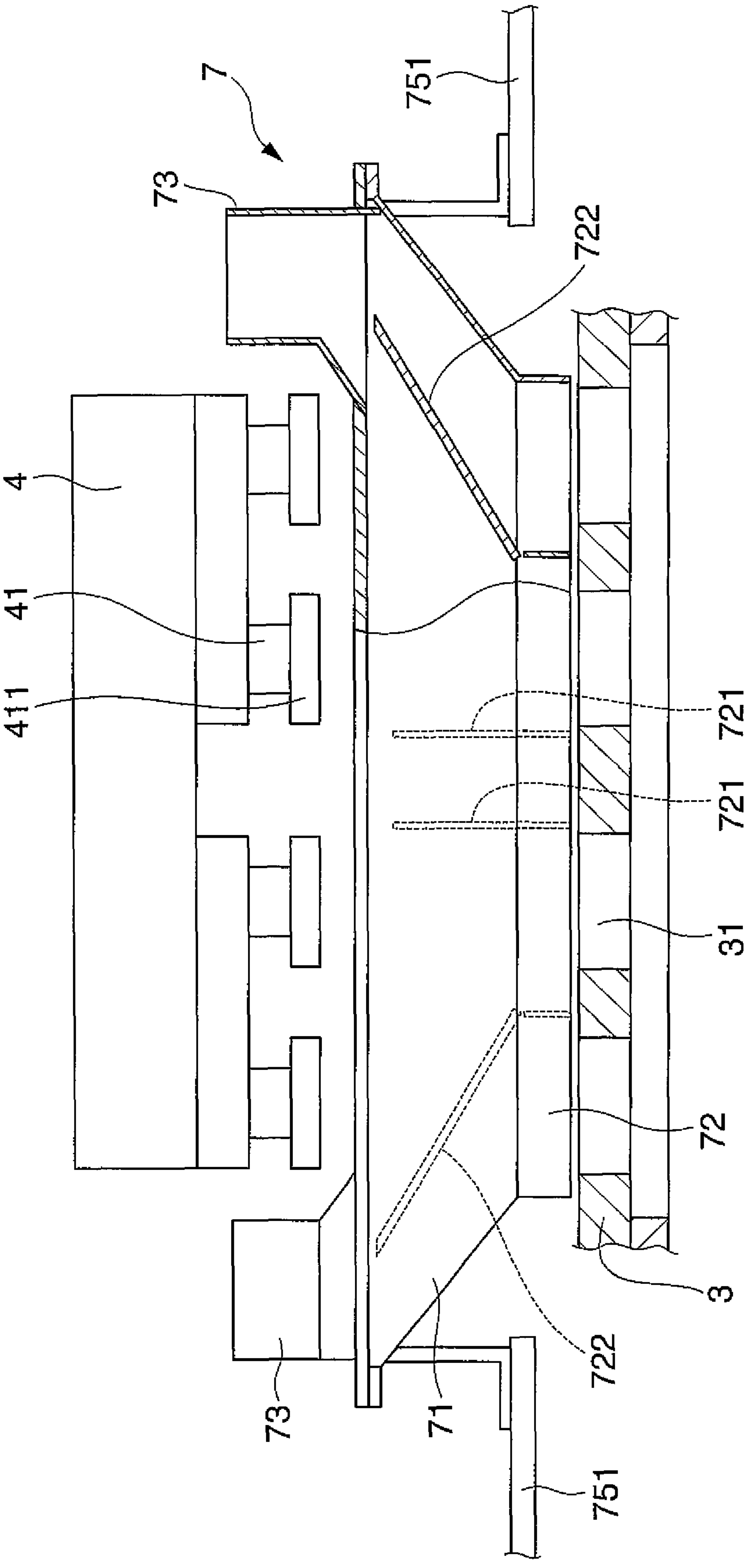
FIG. 15 is a partially cross-sectional enlarged view of the powder supply funnel of a powder supply mechanism section constituting part of the molding machine.

Referring to FIGS. 2 to 4, a powder supply funnel 7 is disposed in the compression molding zone 21 so as to be close to the upper surface of the slide plate 3. This funnel 7 is an almost square box-like member having an opening lower end surface, in which a square frame-like opening portion 72 is joined to the lower end of an inverse four-sided pyramid-like funnel main body 71 as shown in FIG. 15. In addition, powder supply pipes 73, 73 are mounted to both ends of the upper surface of the funnel main body 71. The powder supply pipes 73, 73 are connected to corresponding hoppers 74, 74 (see FIGS. 3 and 4) mounted to upper portion of the machine main body 2.

A pair of partition plates 721, 721 are provided inside the powder supply funnel 7 to extend upright at its central portion so as to correspond to the array of the through-die holes 31 of the slide plate 3. Thus, the funnel 7 is internally partitioned into left and right supply sections. Baffle plates 722, 722 are respectively provided to extend obliquely from the respective centers of the left and right supply sections to the respective central portions of the powder supply pipes 73, 73 located at both ends of the upper surface of the funnel main body. Thus, the powder supplied from the powder supply pipes 73, 73 are uniformly discharged from the lower end surface of the funnel. The powder supply pipes 73, 73 are connected to the corresponding hoppers 74, 74 via flexible pipes 741 (see FIGS. 7, 8 and 10). The powder supply funnel 7, hoppers 74, 74 and flexible pipes 741 constitute a powder supply mechanism section.

The powder supply funnel 7 is supported via sliders 751, 751 by guide bars 75, 75 attached to the machine main body 2 as shown in FIGS. 5 and 6. The funnel 7 is reciprocated along the guide bars 75, 75 by a drive source not shown with its lower end opening surface brought into close to the upper surface of the slide plate 3. In this way, molding powder is poured in the through-die holes 31 of the first and second molding die sections 32, 33 located in the compression molding zone 21.

Figure 9:
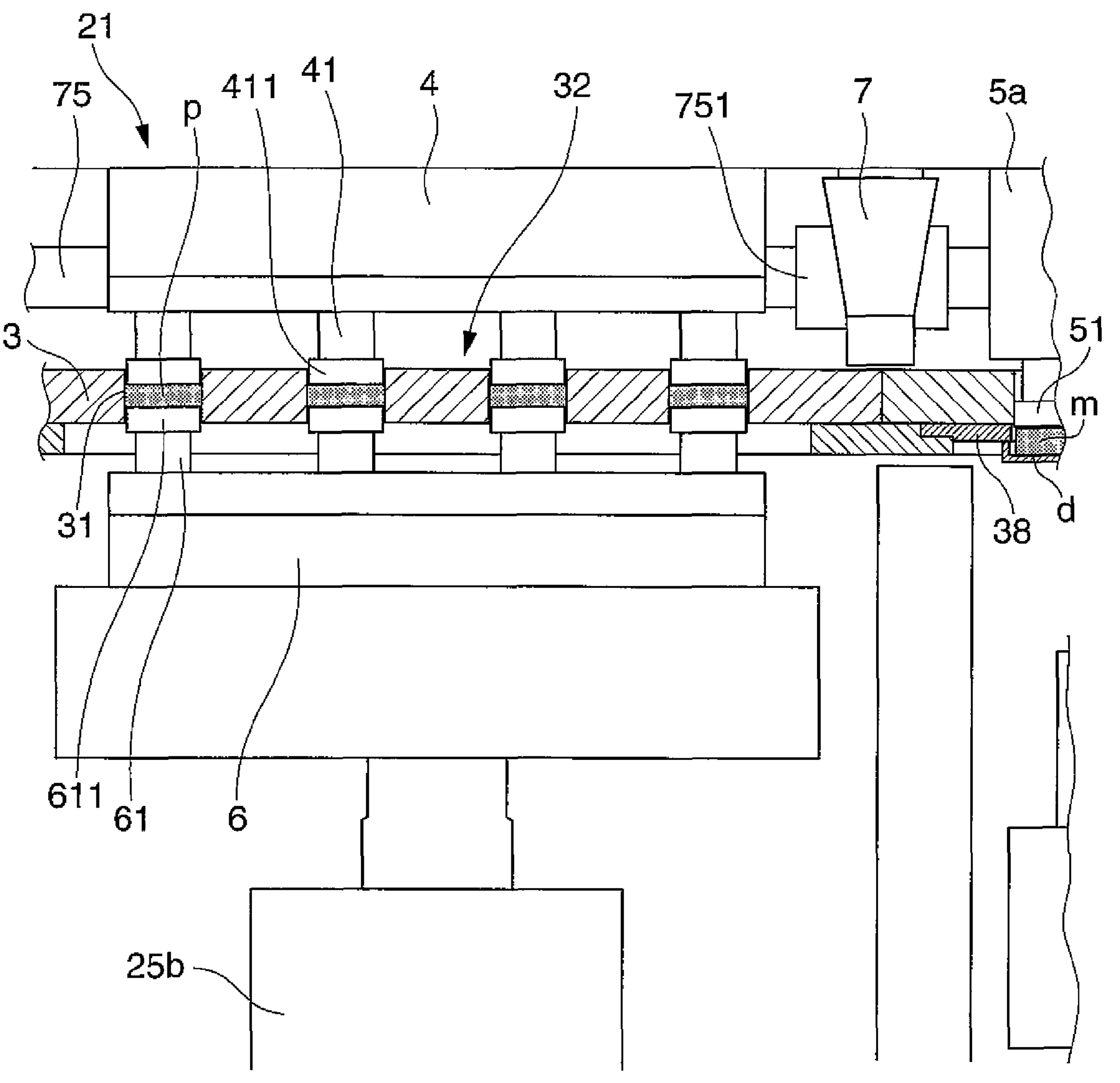
FIG. 9 is an enlarged schematic diagram illustrating the compression molding zone of the molding machine.

The travel range of the powder supply funnel 7 is a range where the funnel 7 traverses the first or second molding die section 32, 33 of the slide plate 3 in the compression molding zone 21. As shown in FIG. 9, the funnel 7 is located between the upper punch body 4 and the one compact discharger 5*a* in the one movement limit.

Spaces 27, 27 each opening laterally are provided below the slide plate 3 at respective positions corresponding to the compact discharge zones 22*a*, 22*b* of the machine main body 2 as shown in FIG. 3. The first and second conveyors a1, a2 (see FIG. 1) pass through the corresponding spaces 27, 27.

Referring to FIGS. 3 and 11 to 14, a pair of lifting arms (collection tray lifting devices) 8, 8 are disposed in each of the spaces 27, 27 so as to put a corresponding one of the conveyors a1, a2 therebetween. The lifting arms 8, 8 can temporarily lift a collection tray d put on each of the conveyors a1, a2 and return it onto the corresponding one. The lifting arms 8, 8 and conveyors a1, a2 constitute a compact collection mechanism section. Incidentally, each of the first and second conveyors a1, a2 transfers the collection tray d through intermittent rotation.

The operation of the powder compression molding machine is next described with reference to FIGS. 5 to 14.

Figure 7:
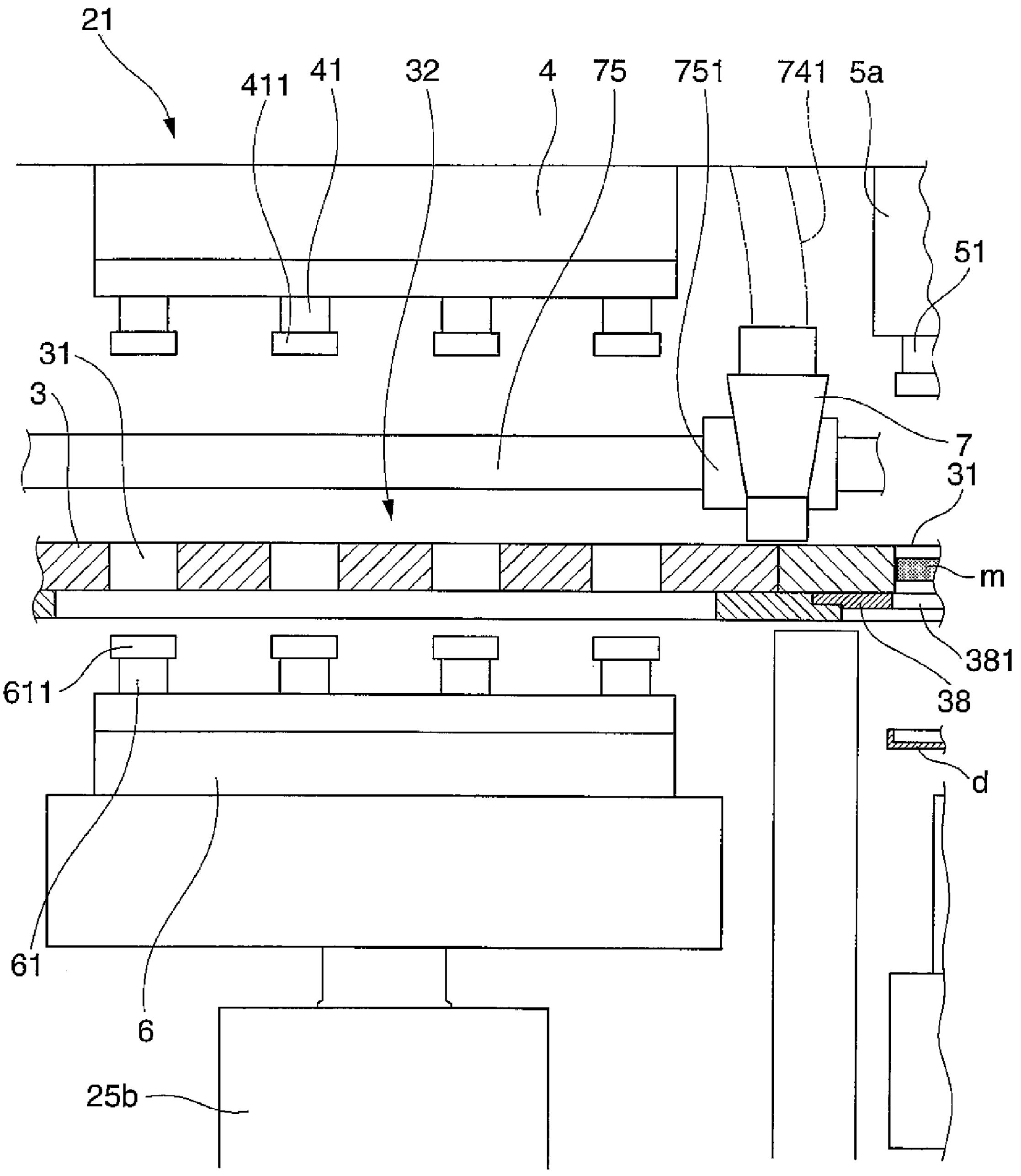
FIG. 7 is an enlarged schematic diagram illustrating the compression molding zone of the molding machine.

When the slide plate 3 is located at the one slide limit as shown in FIG. 5, the first molding die section 32 provided in the intermediate portion of the slide plate 3 is located in the compression molding zone 21 as shown in FIGS. 5 and 7.

Figure 11:
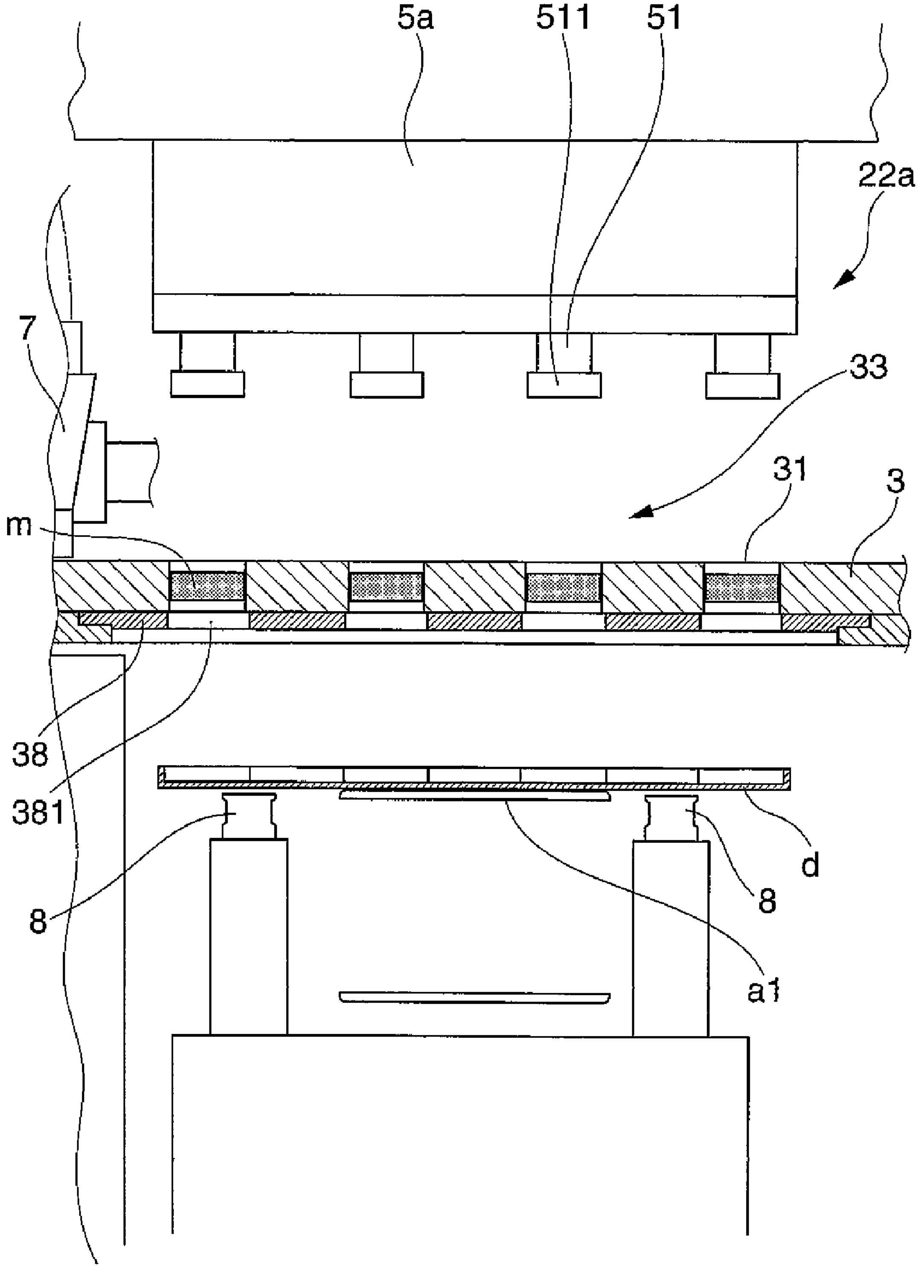
FIG. 11 is an enlarged schematic diagram illustrating a compact discharge zone of the molding machine.

At this time, the second molding die section 33 provided at one end portion of the slide plate 3 is located in the one compact discharge zone 22*a* as shown in FIGS. 5 and 11. In addition, compacts m molded by the previous molding operation are retained in all the through-die holes 31 of the second molding die section 33.

Figure 8:
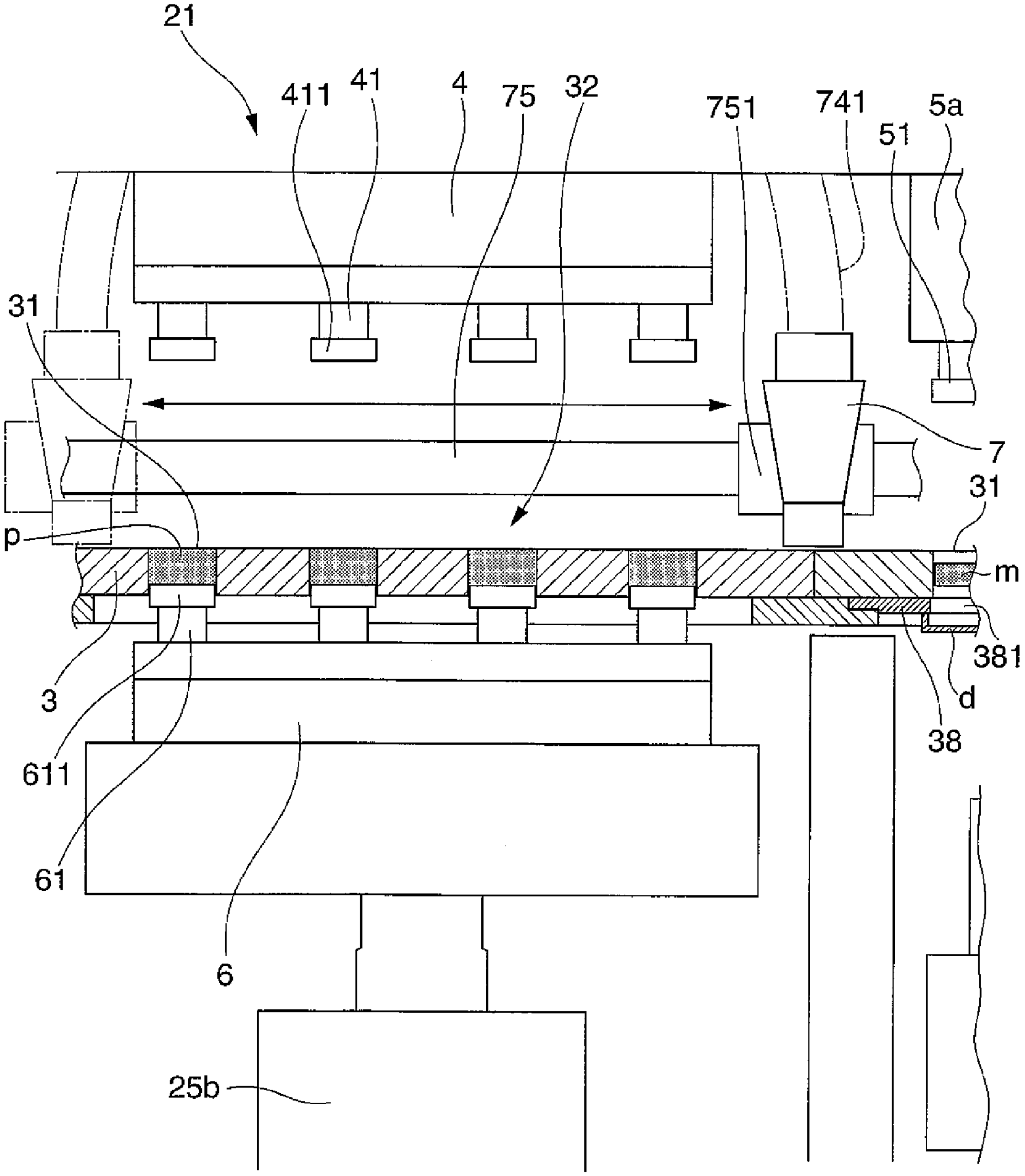
FIG. 8 is an enlarged schematic diagram illustrating the compression molding zone of the molding machine.

From this state, the lower punch body 6 is lifted to a desired height by being driven by the second hydraulic cylinder 25*c* (see FIGS. 3 and 4) as shown in FIG. 8. In addition, the compression parts 611 of the lower punches 61 enter from below the through-die holes 31 of the first molding die section 32 to form bottom walls in the through-die holes 31. In this state, the powder supply funnel 7 pours molding powder p in the through-die holes 31 while reciprocating along the upper surface of the slide plate 3 (see arrows in FIG. 8).

Figure 12:
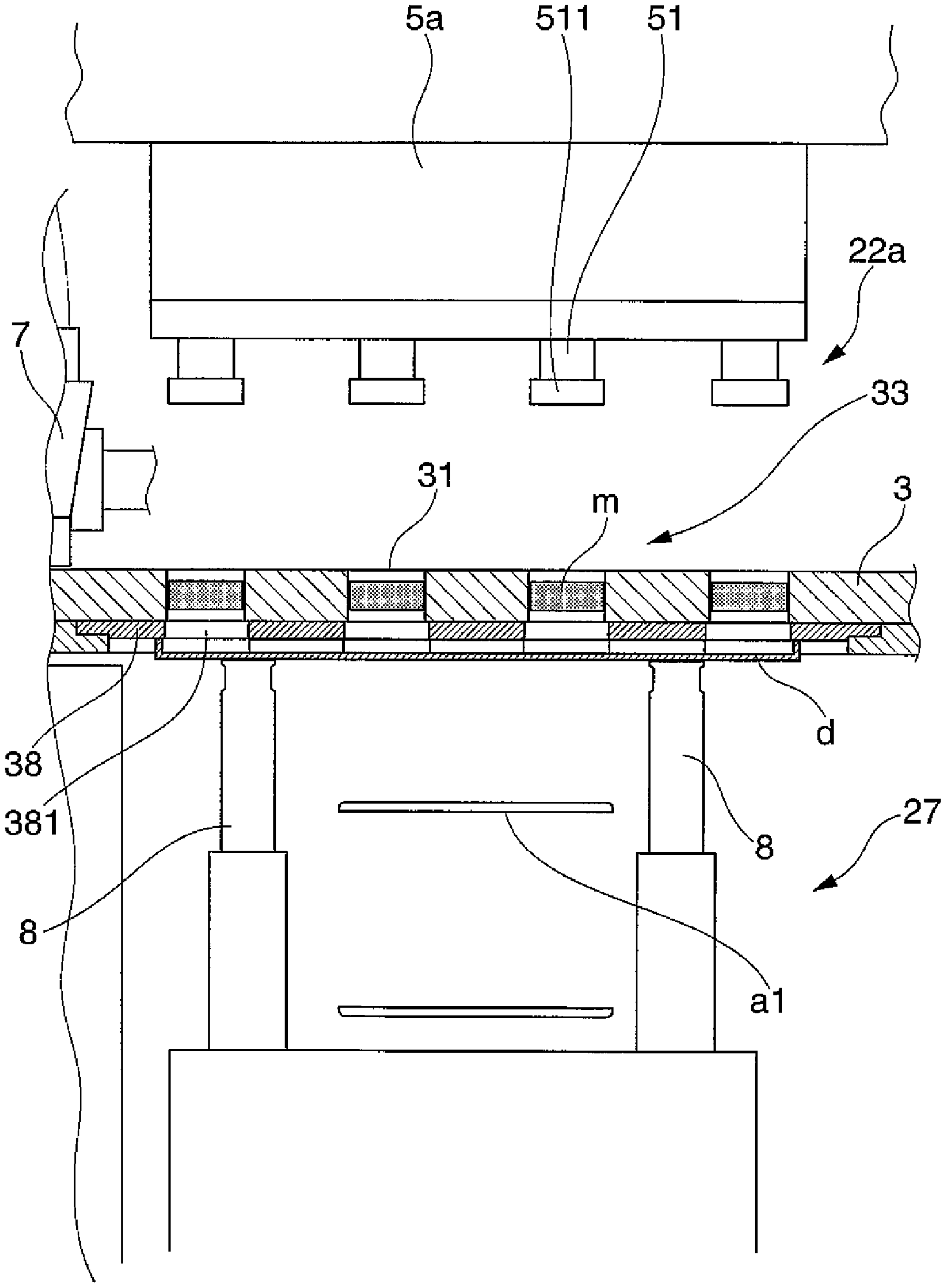
FIG. 12 is an enlarged schematic diagram illustrating the compact discharge zone of the molding machine.

At this time, the collection tray d put on the conveyor a1 is lifted by the lifting arms 8, 8 in the one compact discharge zone 22*a* as shown in FIG. 12 to come into close to the lower surface of the discharge guide plate 38 in the compact discharge zone 22*a*.

Next, the upper punch body 4 is moved downward by being driven by the hydraulic cylinders 25*a* (see FIGS. 3 and 4) in the compression molding zone 21 while the compression parts 411 of the upper punches 41 enter the through-die holes 31 to press the molding powders p in the through-die holes 31. At the same time, the lower punch body 6 is lifted by being driven by the first hydraulic cylinder 25*b* while the compression parts 611 of the lower punches 61 press the molding powder p. Thus, the molding powder p is compressively molded between both the compression parts 411, 611 of the upper and lower punches 41, 61.

Figure 13:
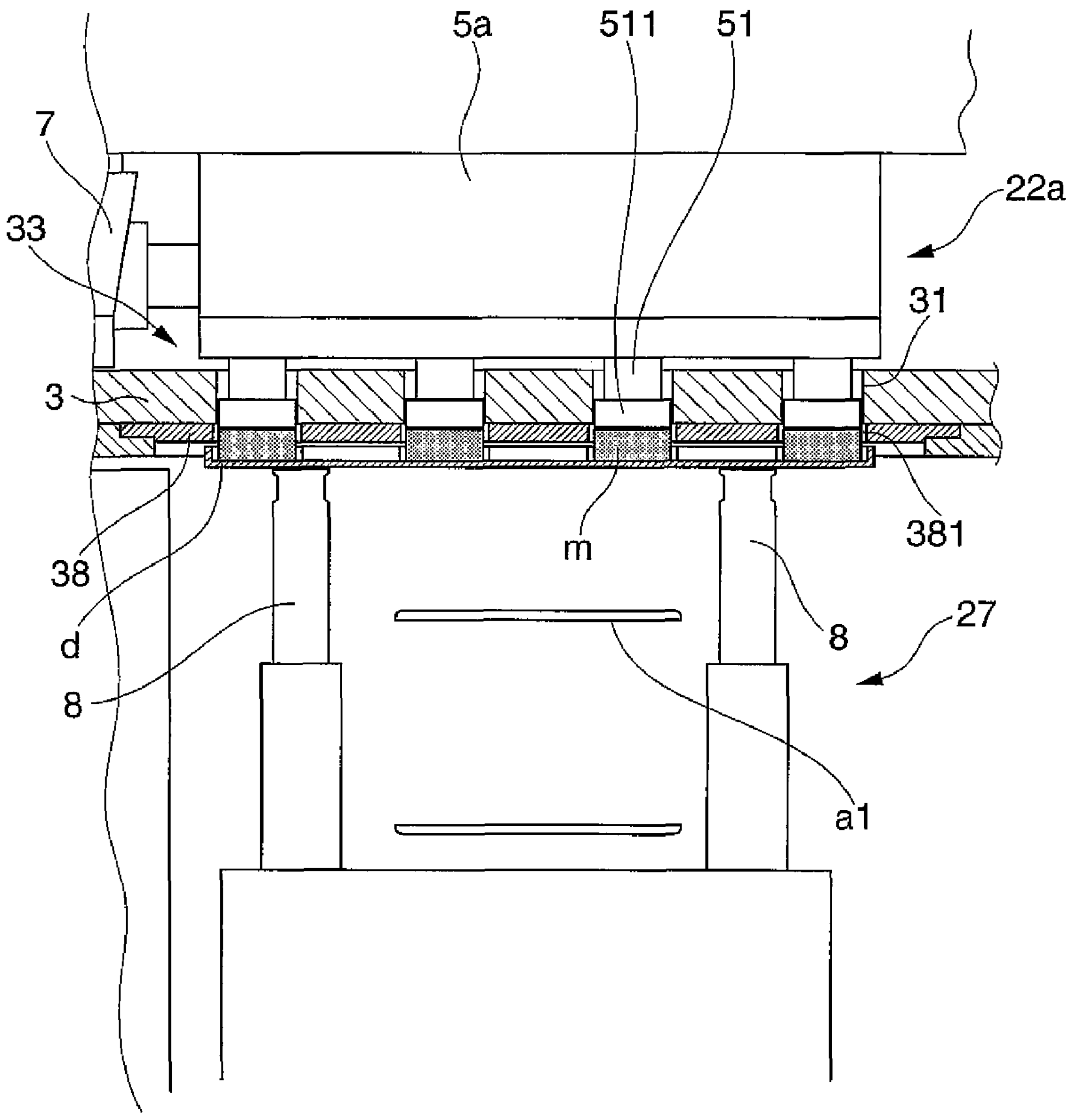
FIG. 13 is an enlarged schematic diagram illustrating the compact discharge zone of the molding machine.

At this time, the one compact discharger 5*a* moves downward integrally with the upper punch body 4 in the one compact discharge zone 22*a* so that the depressing parts 511 of the discharge pins 51 enters the through-die holes 31 of the second molding die section 33 from above as shown in FIG. 13. In this way, the depressing parts 511 push out the compacts m in the through-die holes 31 downwardly and put them on the collection plate d through the compact passing holes 31 of the discharge guide plate 38.

Further, at this time, the upper punch body 4 and the one compact discharger 5*a* move downward integrally with the other compact discharger 5*b* in the other compact discharge zone 22*b* (see FIGS. 2, 3 and 5). Since the punch insertion section 35 of the slide plate 3 is located in the other compact discharge zone 22*b* as shown in FIG. 5, the discharge pins 51 of the compact discharger 5*b* are inserted into the circular through-holes 34 of the punch insertion section 35 although not shown particularly in the figure.

Figure 10:
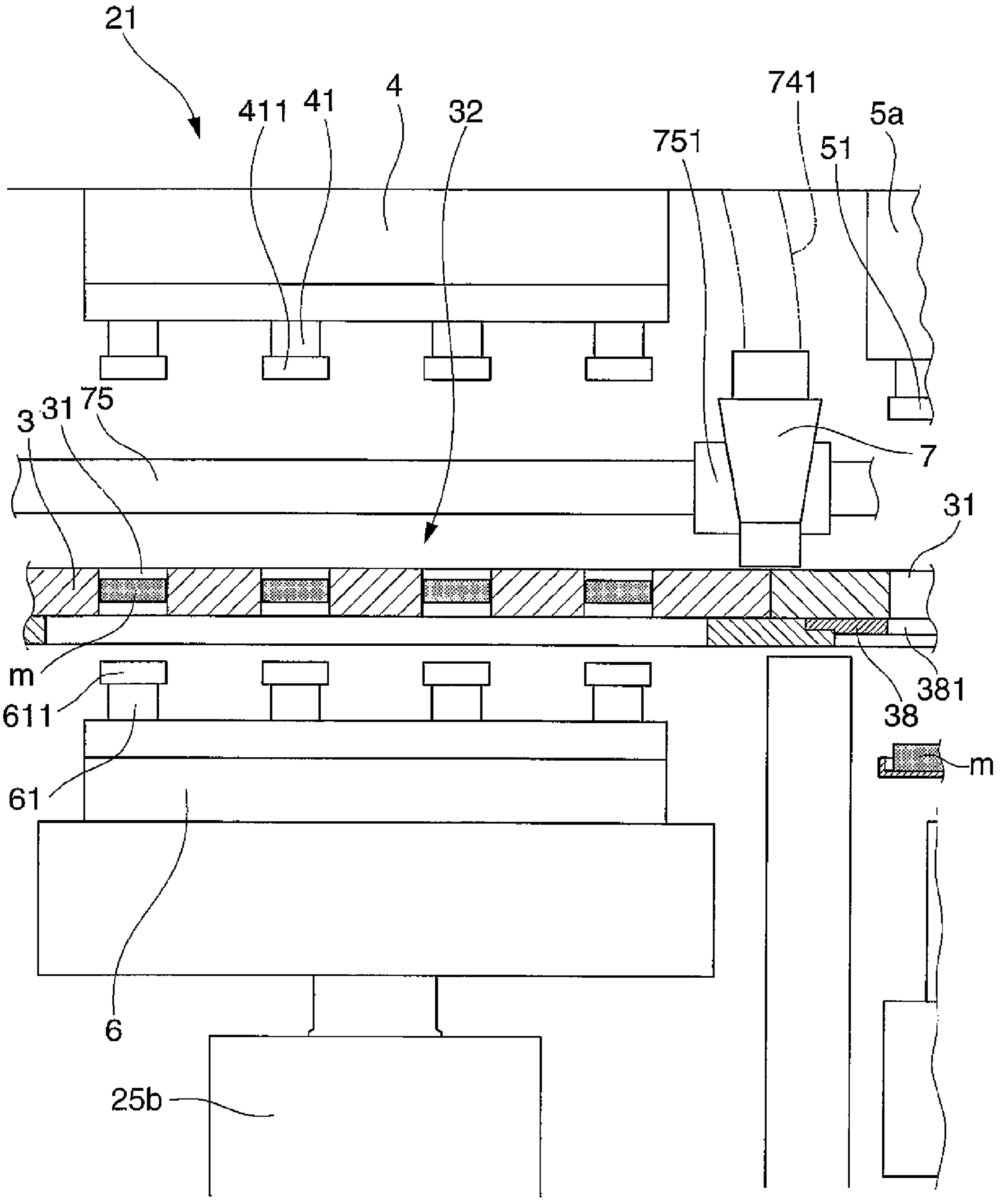
FIG. 10 is an enlarged schematic diagram illustrating the compression molding zone of the molding machine.

Next in the compression molding zone 21, the upper punch body 4 is moved upward by being driven by the hydraulic cylinder 25*a* (referred to as FIGS. 3 and 4) as shown in FIG. 10, while the lower punch body 6 is moved downward by being driven by the first and second hydraulic cylinders 25*b*, 25*c*. Consequently, both the compression parts 411, 611 of the upper and lower punches 41, 61 withdraw from the through-die holes 31 so that the compacts m are retainably left in the through-die holes 31.

Figure 14:
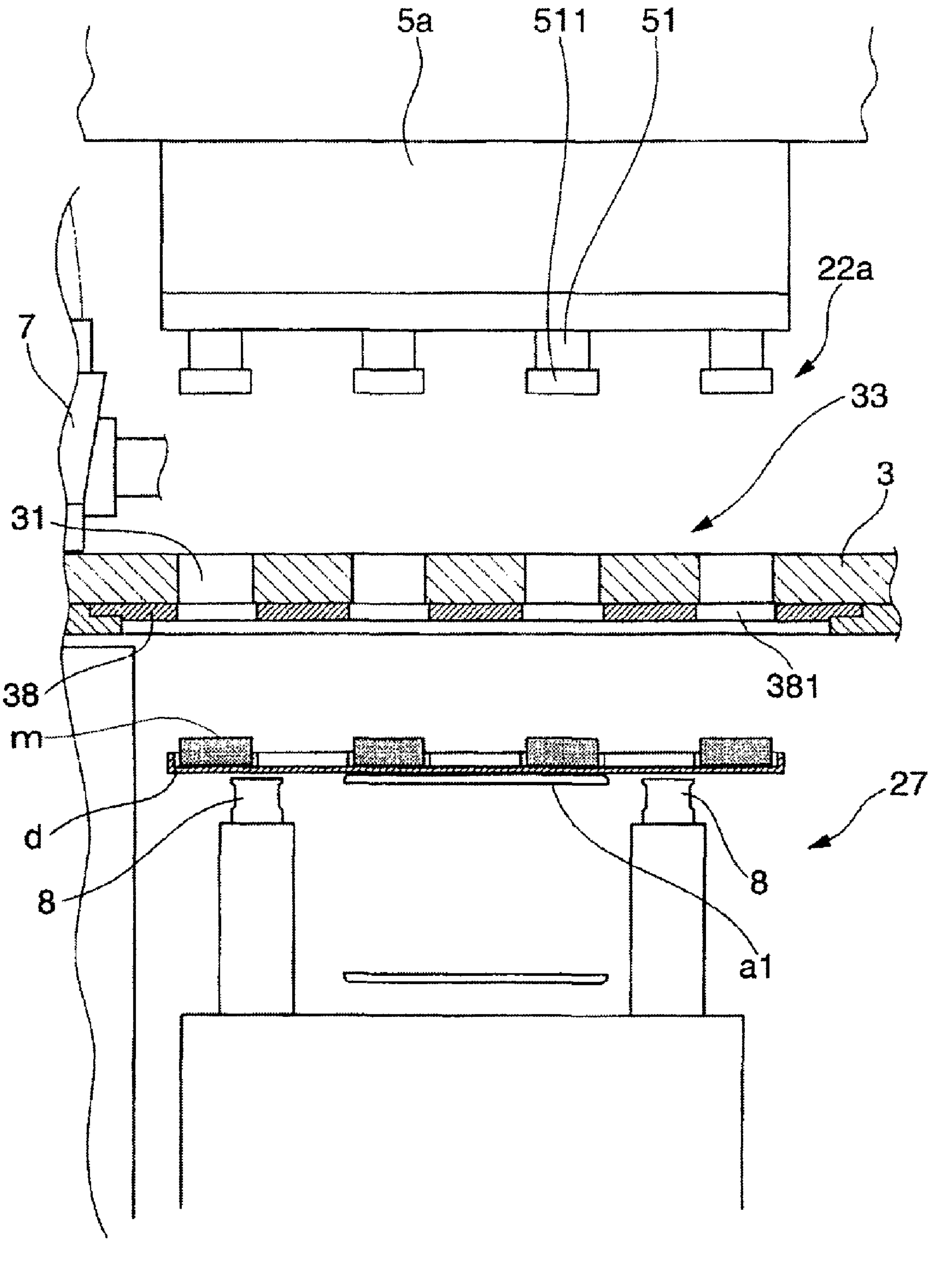
FIG. 14 is an enlarged schematic diagram illustrating the compact discharge zone of the molding machine.

At this time in the one compact discharge zone 22*a*, the lifting arms 8, 8 move downward so that the collection tray d on which the compacts m put is placed on the conveyor a1 again as shown in FIG. 14. Then, the conveyor a1 turns to discharge the compacts m from the powder compression molding machine 1.

Next, the slide plate 3 is driven by the drive screw 23 to move to the other slide limit as shown in FIG. 6. The second molding die section 33 where the through-die holes 31 are empty after the compacts m have been discharged in the one compact discharge zone 22*a* is moved to the compression molding zone 21. At the same time, the first molding die section 32 where the compacts m molded in the compression molding zone 21 are retained in the through-die holes 31 is moved to the other compact discharge zone 22*b*.

In the compression molding zone 21, the powder compacts m are molded in the through-die holes 31 of the second molding die section 33 in the same operation as the molding operation described with FIGS. 7 to 10. In the other compact discharge zone 22*b* the compacts m in the through-die holes 31 of the first molding die section 32 are discharged in the same manner as the molding operation described with FIGS. 11 to 14. The compacts thus discharged are placed on the collection tray d and then discharged by the conveyor a2 from the powder compression molding machine 1.

Thereafter, the slide plate 3 slidably moves in a reciprocative manner. Along with this slide movement, the same compression molding as the above is alternately performed on the first and second molding die sections 32, 33 in the compression molding zone 21. At the same time, the discharge operation of compacts from the second molding die section 33 in the one compact discharge zone 22*a* and the discharge operation of compacts from the first molding die section 32 in the other compact discharge zone 22*b* are repeated alternately. In this way, the powder compression molding is performed repeatedly.

As described above, the powder compression molding machine 1 is configured such that the lower punches 61 of the lower punch body 6 and the upper punches 41 of the upper punch body 4 are caused to enter a large number of (16 in the embodiment) the through-die holes 31 provided in each of the first and second molding die sections 32, 33 of the slide plate 3, thereby compressively molding the molding powder p in the through-die holes 31. Therefore, even if the powder p is compressively molded at a low compression force by upwardly and downwardly moving the upper and lower punches 41, 61 at low speed to provide compacts m each having high porosity, a large number of (16 in the embodiment) compacts can be molded at the same time. In addition, the two molding sections, the first and second molding die sections 32, 33, are provided so that the compression molding is performed in the one molding die sections while the compact discharge operation is performed in the other molding die section. Therefore, even if the compression molding by a low compression force is performed at a relatively low speed, throughput is not reduced significantly and compacts having high porosity can efficiently be provided.

In the powder compression molding machine 1 of the present invention, the compacts m retained in the through-die holes 31 are pressed out downwardly by the discharge pins 51 and discharged below the slide plate 3 formed with the through-die holes 31. The compacts m are received by the collection tray d below the slide plate 3. That is to say, the compacts m are satisfactorily discharged and collected without application of a large load thereto. In other words, even the compacts m compressively molded at a low compression force and having high porosity can be discharged and collected without being damaged.

The powder compression molding machine 1 of the present embodiment is configured to mold a large number of (16 in the embodiment) the compacts m at a time unlike a system such as the conventional rotary tableting machine which uses punches to compressively mold powder speedily and continuously. Thus, if the same throughput as that of the conventional rotary tableting machine is provided, compression molding can be performed by a low compression force at a relatively slow speed, whereby compacts m having high porosity can be molded. Further, since both the upper and lower punches 41, 61 are operated for compression molding, the hardness of the compressed surfaces can be adjusted. This can cause even compression molding at a low compression force to provide compacts having high porosity and reduce damage to the compacts at the time of discharge and collection from the compression molding machine.

The two powder compression molding machines 1 are prepared in the embodiment. As shown in FIG. 1, the two machines 1, 1 are installed to be juxtaposed to each other. In addition, the first conveyor a1 that passes through the one compact discharge zones 22*a* of the machines 1, 1 and the second conveyor a2 passing through the other compact discharge zones 22*b* are installed. The compact continuous fabrication system is configured in this way. The one machine 1 alternately puts compacts m on the collection trays d transported by both the conveyors a1, a2 and discharges them. At the same time, the other machine 1 alternately puts compacts on collection trays d which are transferred on the conveyors a1, a2 and on which no compacts are put and discharges them. Thus, the powder compacts can continuously be fabricated.

In other words, the powder compression molding machine 1 is configured to include the two compact discharge zones 22*a*, 22*b* from which compacts are alternately discharged. Then, the two powder compression molding machines 1 are installed to be juxtaposed to each other. The first conveyor a1 for transferring the collection tray d is disposed to pass through the one compact discharge zone 22*a* of each of the molding machines 1, 1. Similarly, the second conveyor a2 is disposed to pass through the other compact discharge zone 22*b* of each of the molding machines 1, 1. The molding machines 1, 1 alternately discharge and supply the compacts m through the collection tray d on the first conveyor a1 and the collection tray d on the second conveyor a2. Thus, the compacts m are steadily and continuously discharged and supplied to the first and second conveyors a1, a2 for fabricating compacts efficiently.

Accordingly, this powder compact continuous fabrication system can significantly efficiently and continuously fabricate compression compacts having high porosity.

Referring to FIG. 1, in the embodiment, first weight measurement instruments b, b which measure the weights of the collection trays d are installed along the first and second conveyors a1, a2 and on the upstream side of the molding machines 1, 1, respectively. In addition, second weight measurement instruments which measure the weights of the collection trays d on which compacts m are put are installed on the downstream side of the molding machines 1, 1, respectively. Thus, the weight of the compacts m is checked based on a difference in weight between the weight of the collection tray d on which the compacts m are put and the weight of the collection tray d on which compacts are not put yet. Consequently, the compacts obtained are reliable with respect to weight.

As described above, the powder compression molding machine 1 of the present embodiment can satisfactorily mold and collect compacts without crumblingness even when powder is compressively molded at a lower compression force into relatively large solids having high porosity like when powder milk is compressively molded into solid milk. In addition, the molding machine 1 can provide compacts m having sufficient high porosity and being dissolvable in water or the like. Further, the powder compact continuous fabrication system composed of the two powder compression molding machines 1 according to the embodiment can fabricate the above-mentioned compacts m significantly efficiently and continuously.

Incidentally, the present invention is not limited to the embodiment described above. The powder compression molding machine can satisfactorily and efficiently mold and collect compacts without crumblingness even by compressively molding powder into relatively large solids by a low compression force as described above. Specifically, this molding machine can be suitably used to compressively mold powder milk into solid milk or the like. The use application of the molding machine according to the invention is not limited to this. The molding machine can be preferably used for various applications as long as they are used to compressively mold powder into solids. In addition, the configuration, shape, arrangement, combination and the like of each portion are not limited to those of the embodiment described above and may appropriately modified or altered in a range not departing from the gist of the present invention.

The invention claimed is:

1. A powder compression molding machine comprising:

a machine main body having a compression molding zone and two compact discharge zones formed on both sides of the compression molding zone;

a slide plate provided in the machine main body so as to be slidable horizontally;

a first molding die section provided in the slide plate so as to include a plurality of arrayed through-die holes;

a second molding die section including a plurality of through-die holes arrayed in the same manner as the first molding die section and juxtaposed to the first molding die section in the slide direction on the slide plate;

an upper punch body having a plurality of upper punches arrayed to correspond to the through-die holes and disposed above the slide plate so as to be movable upward and downward in the compression molding zone;

two compact discharger each having a plurality of discharge pins disposed to correspond to the through-die holes and disposed above the slide plate so as to be movable upward and downward in the two compact discharge zones;

a lower punch body having a plurality of lower punches arrayed to face the upper punches and disposed below the slide plate so as to be movable upward and downward;

a powder supply mechanism section for pouring molding powder in the through-die holes of the slide plate in the compression molding zone; and compact collection mechanism sections disposed below the slide plate in the respective two compact discharge zones, wherein the slide plate is slid to one of slide limits in which the first molding die section is located at the compression molding zone and the second molding die section is located at one of the compact discharge zones, and to the other of the slide limits in which the second molding die section is located at the compression molding zone and the first molding die section is located at the other of the compact discharge zones, in the compression molding zone the lower punches of the lower punch body enter the through-hole die holes of the first or second molding die section to form the bottom walls of the through-die holes, molding powder is poured into the through-die holes by the powder supply mechanism section, and the upper punches of the upper punch body enter the through-die holes, the molding powder is compressively molded by and between the upper punches and the lower punches, in the one compact discharge zone the discharge pins of the compact discharger enter the through-die holes of the second molding die section to press out downwardly the compacts from the through-die holes, the compacts being collected by the compact collection mechanism section, and in the other compact discharge zone the discharge pins of the compact discharger enter the through-die holes of the first molding die section to press out downwardly the compacts from the through-die holes, the compacts being collected by the compact collection mechanism section.

2. The powder compression molding machine according to claim 1, wherein the first molding die section is formed at an intermediate portion, in a slide direction, of the slide plate, the second molding die section is formed at one end, in the slide direction, of the slide plate, a punch insertion section including a plurality of through-holes arrayed in the same manner as the through-die holes is formed at the other end, in the slide direction, of the slide plate, and the upper punch body and the two compact dischargers are moved upward and downward simultaneously, in the other compact discharge zone, operations of the upper punch body and the two compact dischargers cause the discharge pins of the compact discharger to enter the through-die holes of the first molding die section to press out downwardly the compacts from the through-die holes, the compacts being collected by the compact collection mechanism section, or causes the discharge pins of the compact discharger to be inserted into the through holes of the punch insertion sections, and the compression molding operation in the compression molding zone and the compact discharge-collection operation in the compact discharge zone are performed simultaneously and the compact discharge is alternately performed in the one compact discharge zone and the other compact discharge zone for each slide movement of the slide plate.

3. The powder compression molding machine according to claim 1 or 2, wherein the powder supply mechanism section includes a powder supply funnel which moves along the upper surface of the slide plate in the compression molding zone while being brought into contact with or close to, and the powder supply funnel pours molding powder into the through-die holes of the first or second die section located in the compression molding zone while moving on or above the slide plate.

4. The powder compression molding machine according to claim 1, wherein the lower punch body moves upward, the lower punches enter the through-die holes at a prescribed position and stop temporarily, molding powder is poured into the through-die holes, the upper punch body moves downward, the upper punches enter the through-die holes and at the same time the lower punch body moves upward again, and the molding power is compressively molded between the upper and lower.

5. The powder compression molding machine according claim 1, wherein the compact collection mechanism section includes conveyors which are disposed below the slide plate in both the compaction discharge zones and intermittently turn to deliver collection trays to the downside of the slide plate and carry out the collection trays, the conveyors deliver the collection trays to the downside of the slide plate and receive compacts discharged from the through-die holes of the slide plate and carry out the collection trays from the molding machine.

6. The powder compression molding machine according to claim 5, wherein each of the compact collection mechanism sections includes the conveyor and a collection tray lifting device which temporarily lifts the collection tray from the conveyor and puts the collection tray on the conveyor again, and the collection tray delivered below the slide plate by the conveyor is temporarily lifted up by the collection tray lifting device, receiving the compacts discharged from the through-die holes closely to the lower surface of the slide plate, then being moved downward again, and is taken out by the conveyor.

7. A powder compact continuous fabrication system comprising:

two of the powder compression molding machines according to claim 5 or 6 juxtaposed to each other;

a first conveyor that passes through one of compact discharge zones included in each molding machine; and a second conveyor that passes through the other of the compact discharge zones included each molding machine, wherein one of the molding machines alternately puts compacts on collection trays transferred by both the conveyors and discharges the compacts and the other of the molding machines alternately puts compacts on collection trays which are transferred by both the conveyors and on which compacts have not been put yet, and discharge the compacts.

8. The powder compact continuous fabrication system according to claim 7, further comprising:

first measurement instruments that are respectively disposed on the upstream side of the two powder compression molding machines along the first and second conveyors and measure weights of the collection trays; and second measurement instruments that are respectively disposed on the downstream side of the two powder compression molding machines and measure weights of the collection trays, wherein the weight of the compacts is checked based on a difference in weight between the collection tray on which the compacts are put and the collection tray on which the collection tray on which the compacts have yet not been put.

* * * * *